United States Patent
Niesen et al.

(10) Patent No.: US 8,582,684 B2
(45) Date of Patent: Nov. 12, 2013

(54) INTERFERENCE ALIGNMENT FOR CHANNEL-ADAPTIVE WAVEFORM MODULATION

(75) Inventors: Urs Niesen, Summit, NJ (US); Thomas L. Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 351 days.

(21) Appl. No.: 13/109,217

(22) Filed: May 17, 2011

(65) Prior Publication Data
US 2012/0294385 A1    Nov. 22, 2012

(51) Int. Cl.
*H04L 27/00*    (2006.01)

(52) U.S. Cl.
USPC ........... 375/295; 375/260; 375/259; 375/296; 375/285

(58) Field of Classification Search
USPC .................. 375/295, 260, 259, 296, 285
See application file for complete search history.

(56) References Cited

U.S. PATENT DOCUMENTS

| 7,653,120 | B2 | 1/2010 | Chen et al. |
| 2007/0183480 | A1 | 8/2007 | Chen et al. |

OTHER PUBLICATIONS

International Search Report dated Sep. 19, 2012 issued in International Application No. PCT/US2012/037059.

*Primary Examiner* — Siu Lee
(74) *Attorney, Agent, or Firm* — Harness, Dickey & Pierce

(57) ABSTRACT

Embodiments provide an apparatus and method for interference alignment for channel-adaptive waveform modulation. The method includes obtaining at least a part of a first matrix and a part of a second matrix for the impulse response function of a communication channel. The method further includes designing a set of one or more linearly independent waveforms based on at least the obtained parts of the first and second matrices such that a first subspace spanned by the linearly independent waveforms when multiplied by the obtained part of the first matrix at least partially overlaps a second subspace spanned by the linearly independent waveforms when multiplied by the obtained part of the second matrix.

20 Claims, 5 Drawing Sheets

INTERFERENCE ALIGNMENT FOR CHANNEL-ADAPTIVE WAVEFORM MODULATION

BACKGROUND

Inter-symbol interference (ISI) is a form of distortion of a signal in which one symbol interferes with subsequent symbols. This is an unwanted phenomenon as the previous symbols have similar effect as noise, thus making the communication less reliable. One of the causes of ISI is multipath propagation in which a wireless signal from a transmitter reaches the receiver via many different paths. The causes of this include reflection (i.e., the signal may bounce off buildings), refraction (such as through the foliage of a tree) and atmospheric effects such as atmospheric ducting and ionospheric reflection. Since all of these paths are of different lengths, this results in the different versions of the signal arriving at different times, resulting in ISI.

Data communication schemes have handled ISI by a variety of techniques. One such technique is known as Orthogonal Frequency Division Multiplexing (OFDM). OFDM uses modulation waveforms that enable the essential removal of ISI in a frequency-dependent channel. For example, in OFDM, each transmitted data block is a weighted superposition of OFDM modulation waveforms. The OFDM modulation waveforms form an orthonormal basis set over a time period ($T_S$-$T_G$) where $T_S$ is the length of the OFDM block (also referred to as symbol-interval of duration $T_S$) and $T_G$ is the duration of either a guard interval or a cyclic prefix, both expressed as a multiple of the sampling interval. Because ISI does not distort symbols separated by more than the communication channel's delay-spread $T_D$, the guard interval $T_G$ is selected to be greater than or equal to the delay spread $T_D$ in OFDM. In an OFDM block, the weights of the superposition define the data symbol being transmitted.

At the receiver, in OFDM, each transmitted data block is demodulated by projecting the received data block onto a basis set of conjugate OFDM modulation waveforms. Because the OFDM modulation waveforms are a basis set over the period ($T_S$-$T_G$), the projections may be performed over the last period ($T_S$-$T_G$) of the OFDM data blocks. That is, the projections do not need to use prefix portions of the OFDM data blocks. Because the channel memory is limited to a time of length $T_D$, an earlier transmitted OFDM block only produces ISI in the cyclic prefix or guard portion of the next received OFDM data block. Thus, by ignoring said cyclic prefix or guard portions of received OFDM data blocks, OFDM produces demodulated data that is free of distortion due to ISI. OFDM techniques may also effectively diagonalize the communication channel.

Unfortunately, cyclic prefix and guard portions of OFDM data blocks consume bandwidth that might otherwise be used to transmit data. As the communication channel's delay-spread $T_D$ approaches the temporal length of the OFDM data block $T_S$, the bandwidth $T_S$-$T_D$ remaining for carrying data shrinks to zero. For example, when the channel delay-spread is equal to the symbol interval, then OFDM is 0% efficient because the redundant cyclic prefix occupies the entire symbol interval. Increasing the symbol interval $T_S$ would alleviate this problem, but this results in increased communication delay, which might not be tolerable depending on the application.

In order to overcome the bandwidth-deficient channel whose delay-spread approaches the length of the OFDM block, Chen et al. (U.S. Pat. No. 7,653,120) introduces a Channel Adaptive Waveform Modulation (CAWM) that generates modulating waveforms from the channel impulse response itself. When the channel delay-spread is equal to the symbol interval, CAWM is 50% efficient because the number of orthogonal data-symbol-bearing waveforms that can be created is equal to half the symbol-interval. When the delay-spread is equal to twice the symbol interval, then CAWM is ⅓ (33%) efficient. This compares to a 0% efficiency of OFDM in both cases.

SUMMARY

Embodiments provide an apparatus and method for interference alignment for channel-adaptive waveform modulation.

The method includes obtaining at least a part of a first matrix and a part of a second matrix for the impulse response function of a communication channel. The part of the first matrix relates to channel-induced interference between a current data block and a previously transmitted first data block, and the part of the second matrix relates to channel-induced interference between the current data block and a previously transmitted second data block, the second data block being transmitted before the first data block.

The method further includes designing a set of one or more linearly independent waveforms based on at least the obtained part of the first matrix and the obtained part of the second matrix for the impulse response function such that a first subspace spanned by the linearly independent waveforms when multiplied by the obtained part of the first matrix at least partially overlaps a second subspace spanned by the linearly independent waveforms when multiplied by the obtained part of the second matrix.

In one embodiment, the designing step designs the set of linearly independent waveforms such that the first subspace and the second subspace occupy a same linear space. Further, the designed set may include a subset of eigenvectors of a product of (1) an inverse of the first matrix and (2) the second matrix. The subset may comprise the right eigenvectors of the product.

In another embodiment, the designing step further includes obtaining eigenvectors and corresponding eigenvalues based on an eigenvector decomposition of a product of (1) an inverse of the first matrix and (2) the second matrix, and selecting a subset of the obtained eigenvectors.

Also, the designing step may further include configuring a second set of waveforms based on the selected subset, where the configured second set of waveforms is an orthogonal complement of the product of the selected subset and either of the first or the second matrices.

In one embodiment, the first data block immediately precedes the current data block and the second data block immediately precedes the first data block.

The method may further include transmitting a set of pilot signals over the communication channel that is between the transmitter and the receiver, where the part of the first matrix and the part of the second matrix for the impulse response function are obtained responsive to measurements of said pilot signals.

The method further includes, for each one of the data blocks of the sequence, modulating the waveforms of the designed set to have amplitudes responsive of a received input data symbol and linearly superimposing the modulated waveforms to produce each one of the data blocks.

In one embodiment, the designed set has a number of waveforms equal to one half of a symbol interval when the delay spread is twice the symbol interval.

The apparatus includes a transmitter having an array of modulators, where each modulator is configured to modulate an amplitude of a corresponding one of linearly independent waveforms over a sequence of sampling intervals in response to receipt of each of a sequence of input data symbols, an adder configured to form a sequence of data blocks, where each data block is a linear superposition of modulated transmitter waveforms produced by the modulators responsive to receipt of one of the input data symbols and the adder is configured to transmit the data blocks via a communication channel.

The transmitter configures the modulated waveforms in a manner responsive to a part of a first matrix and a part of a second matrix for the impulse response function of a communication channel. The part of the first matrix relates to channel-induced interference between a current data block and a previously transmitted first data block, the part of the second matrix relates to channel-induced interference between the current data block and a previously transmitted second data block, the second data block being transmitted before the first data block. The transmitter configures the modulated waveforms such that a first subspace spanned by the modulated waveforms when multiplied by the part of the first matrix at least partially overlaps a second subspace spanned by the modulated waveforms when multiplied by the part of the second matrix.

In one embodiment, the transmitter configures the modulated waveforms such that the first subspace and the second subspace occupy a same linear space. Further, the modulated waveforms may include a subset of eigenvectors of a product of (1) an inverse of the first matrix and (2) the second matrix. The subset may comprise right eigenvectors of the product. The transmitter configures the modulated waveforms by obtaining eigenvectors and corresponding eigenvalues based on an eigenvector decomposition of a product of (1) an inverse of the first matrix and (2) the second matrix and selects a subset of the obtained eigenvectors.

The transmitter may configure the modulated waveforms by constructing a second set of waveforms based on the selected subset, where the constructed second set of waveforms is an orthogonal complement of the product of the selected subset and either of the first or second matrices.

The apparatus may further include a receiver having an array of demodulators, where the demodulators project the data blocks onto conjugate waveforms to produce estimates of a linear combination of the components of the input data symbols carried by the data blocks being demodulated.

The transmitter may transmit a set of pilot signals over the communication channel that is between the transmitter and the receiver, where the part of the first matrix and the part of the second matrix for the impulse response function is obtained responsive to measurements of said pilot signals.

Each modulator may modulate the amplitude of the corresponding one of linearly independent waveforms to have amplitudes responsive of a received input data symbol and linearly superimposing the modulated waveforms to produce each one of the data blocks.

In one embodiment, the number of modulated waveforms is equal to one half of a symbol interval when the delay spread is twice the symbol interval.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Figure 1:
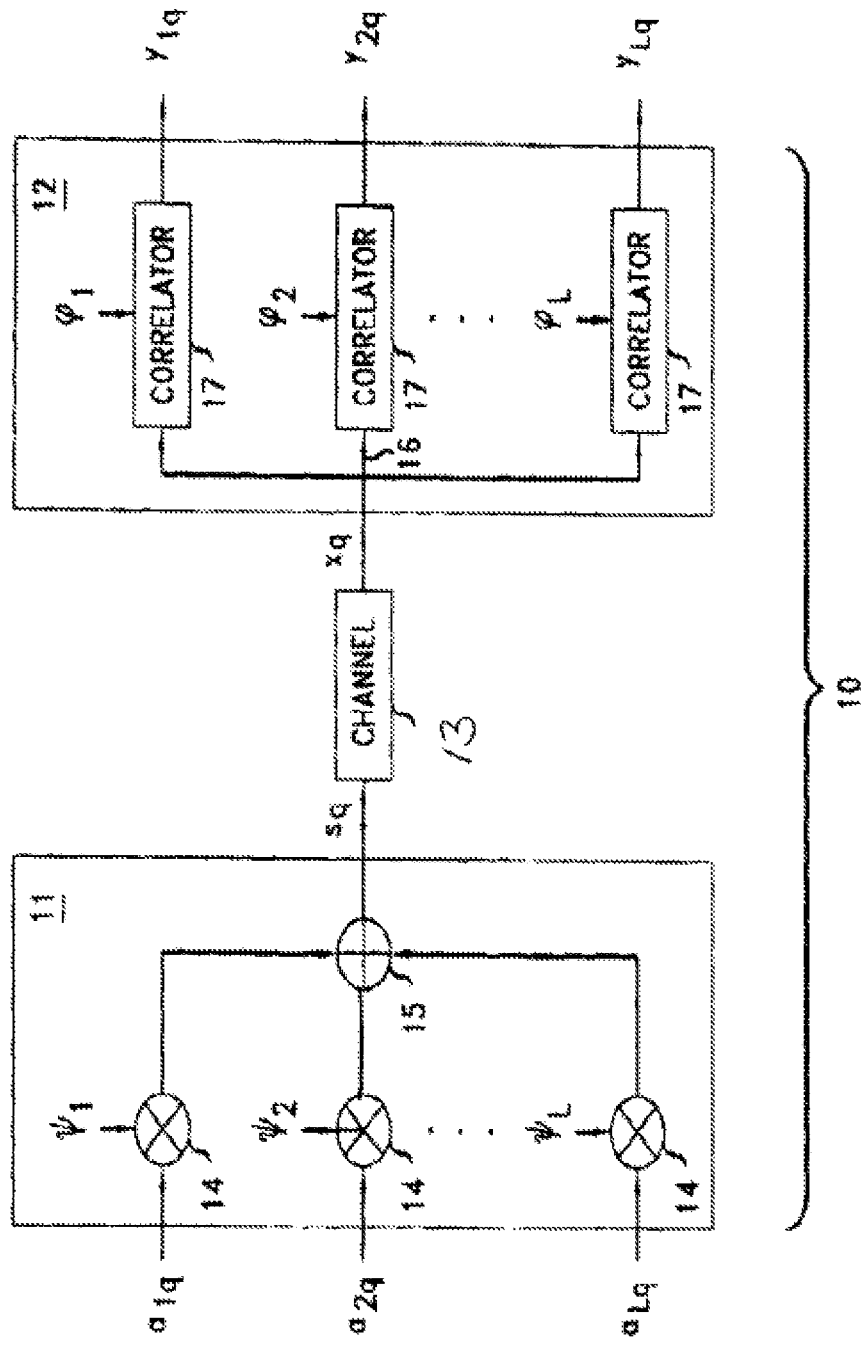
FIG. 1 illustrates a communication system 10 according to an embodiment.

Various example embodiments will now be described more fully with reference to the accompanying drawings in which some example embodiments are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes that include routines, programs, objects, components, data structures, etc., that when executed perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like machines that once programmed become particular machines.

It should be borne in mind, however, that all of these and similar terms are to be associated with the appropriate physical quantities and are merely convenient labels applied to these quantities. Unless specifically stated otherwise, or as is apparent from the discussion, terms such as "obtaining", "designing", "configuring" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Below, parts of the description will use a complex baseband description of the channel and signals as discrete time variables. In this description, the various signals and channel quantities are described as complex baseband functions whose values depend on the sampling interval. A sampling interval t refers to the temporal interval over which a modulator or demodulator applies one data value to the signal being modulated or demodulated. The symbol interval refers to the duration (expressed in terms of the number of sampling intervals) $T_S$ of one block of symbols. The delay spread $T_D$ refers to the length (expressed again in terms of the number of sampling intervals) of a communication channel's memory. The embodiments and claims are meant to cover situations where frequency up-conversion occurs in the transmitter and frequency down-conversion occurs in the receiver as well as situations where no such conversions occur.

Embodiments of the present disclosure employ interference alignment in the context of Channel Adaptive Waveform Modulation (CAWM), as discussed in U.S. Pat. No. 7,653,120, which is incorporated by reference in its entirety. Interference alignment in the CAWM environment ensures that the inter-symbol interference occupies a relatively smaller subspace than it would otherwise occupy. For example, multiple interfering symbols are aligned to fall into the same subspace at the receiver. As a result, an increased number of waveforms may be used in the symbol interval, improving the efficiency of the scheme.

FIG. 1 illustrates a communication system 10 according to an embodiment. The communication system 10 includes a transmitter 11, a receiver 12, and a frequency-dependent communication channel 13. The transmitter 11 includes a parallel array of L modulators 14, and an adder 15. In the array, each modulator 14 is configured to amplitude modulate a received component of an input data symbol onto a waveform, wherein each waveform corresponds to one of the modulators 14. For example, the l-th modulator 14 modulates its waveform with the l-th component $a_{1q}$ of the q-th input data symbol $[a_{1q} a_{2q}, \ldots, a_{Lq}]$ in response to the receipt of the q-th input data symbol in the transmitter 11. In the array, each modulator 14 modulates the input data symbol onto its waveform in parallel with the other modulators 14 of the array. Thus, the array formed by the modulators 14 will produce a temporally synchronized array of L modulated waveforms in response to the receipt of L data symbols. The adder 15 is connected to sum the amplitude modulated waveforms of the array in a temporally aligned manner to produce a temporal sequence of output signals, e.g., $\ldots s_{t-1}, s_t, s_{t+1} \ldots$, for transmission over the communication channel 13. Each of the output signals is a superposition of waveforms modulated at the same sampling interval.

The communication channel 13 transports the signals from the transmitter 11 to the receiver 12. The communication channel 13 may be a wireless channel, an optical fiber channel, or a wire line channel and may be operated in simplex or duplex mode, for example.

Figure 2:
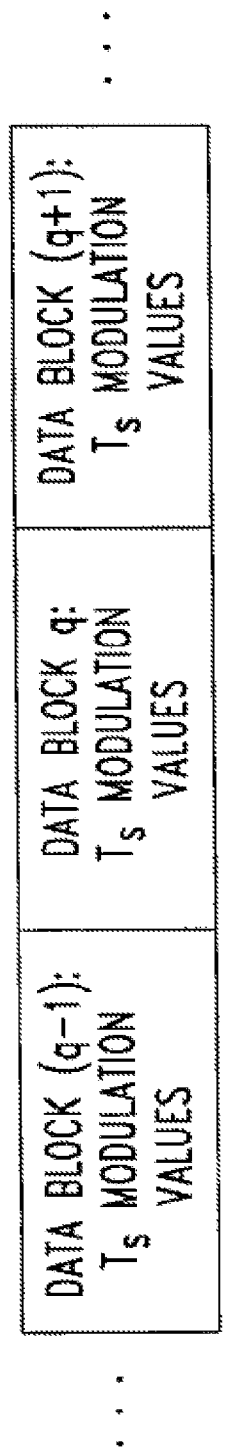
FIG. 2 illustrates a data stream 19 that is transmitted over the channel 13 according to an embodiment.

FIG. 2 illustrates a data stream 19 that is transmitted over the channel 13 according to an embodiment. The communication system 10 transmits a data stream 19 over the communication channel 13 as a sequence of data blocks, e.g., consecutive data blocks (q−1), q, and (q+1). Each data block spans $T_S$ contiguous, non-overlapping sampling intervals, and the different data blocks have equal temporal length. For this reason, it will be convenient to represent the values of any signal variable over a data block as a $T_S$-dimensional vector whose individual components represent the values of the signal variable at individual sampling intervals. That is, the components of such a vector group together the values of the signal variable at the sampling intervals of one data block. For that reason, each component of such a vector will be labeled by two integer indices. The first index will represent the position of the corresponding signal variable in a data block, e.g., an integer in $[1, T_S]$, and the second integer index will represent the position of the data block in the data stream. For example, the "k q" component of such a vector will be the value of the corresponding signal variable during the k-th sampling interval of the q-th data block, i.e., at sampling interval $q \cdot T_S + k$.

Referring back to FIG. 1, the transport over the communication channel 13 transforms each transmitted signal into a corresponding signal at the receiver 12, e.g., $s_t \rightarrow x_t$ for the signals corresponding to the sampling interval "t". The transport over the communication channel 13 effectively convolves output signal, $s_t$, by the communication channel's impulse response, $h_t$, and adds a noise, $w_t$, so that the corresponding signal $x_t$ received at the receiver 12 for the sampling interval "t" is given by:

$$x_t = \sum_{T=0}^{T_D} h_T s_{t-T} + w_t. \qquad \text{Eq. (1)}$$

In Eq. (1), the integer $T_D$ is the delay-spread of the communication channel 13. The delay-spread $T_D$ determines the number of sampling intervals over which an earlier modulated and transmitted signal can produce interference in the received signal corresponding to a later modulated and transmitted signal.

The receiver 12 includes an input 16 and a parallel array of L demodulators 17. The number L of demodulators 17 is typically equal to the number of modulators 14. The input port 16 also transmits the sequence of received signals, i.e., $\ldots x_{t-1}, x_t, x_{t+1} \ldots$, to the demodulators 17 of the array in parallel. Each demodulator 17 projects the received signals onto a conjugate waveform corresponding to the demodulator 17 to produce an estimate, e.g., $y_{1q}$, of a linear combination of the components of the input data symbol carried by the data block being demodulated.

Each individual $y_{1q}$ provides an estimate of the component $a_{1q}$ of the input data symbol. Thus, the number L of demodulators 17 produces a temporally synchronized array of L estimates in response to the receiving one data block from the communication channel 13, e.g., $[y_{1q} y_{2q}, \ldots, y_{Lq}]$ in response to receiving the q-th data block $[x_{1q} x_{2q}, \ldots, x_{T_sq}]$.

The waveforms and the conjugate waveforms may be represented by:

$$\Psi = \begin{bmatrix} \psi_{11} & \psi_{12} & \ldots & \psi_{1L} \\ \psi_{21} & \psi_{22} & \ldots & \psi_{2L} \\ \vdots & \vdots & \vdots & \vdots \\ \psi_{T_s1} & \psi_{T_s2} & \ldots & \psi_{T_sL} \end{bmatrix} \text{ and} \quad \text{Eq. (2)}$$

$$\Phi = \begin{bmatrix} \phi_{11} & \phi_{12} & \ldots & \phi_{1L} \\ \phi_{21} & \phi_{22} & \ldots & \phi_{2L} \\ \vdots & \vdots & \vdots & \vdots \\ \phi_{T_s1} & \phi_{T_s2} & \ldots & \phi_{T_sL} \end{bmatrix}$$

Each column of $\Psi$ is an independent input waveform, and each column of $\Phi$ is an independent output waveform. When the delay spread $T_D$ is greater than the symbol interval $T_S$, the waveform matrix $\Psi$, and the corresponding waveform matrix $\Phi$, is based, at least, on the matrix elements of the part of the impulse response function that relates to interference between the current data block (q) and the first previous data block (q−1), and on the matrix elements of the part of the impulse response function that relates to interference between the current data block (q) and the second previous data block (q−2), e.g., $H_1$ and $H_2$ as further explained below.

Both the waveforms ($\Psi$) and the conjugate waveforms ($\Phi$) may be selected to form orthonormal bases of dimension L over the complex space of dimension $T_S$. The orthonormality conditions on the waveforms and the conjugate waveforms are then described as follows:

$$\Psi^\dagger \cdot \Psi = I_{L \times L} \text{ and } \Phi^\dagger \cdot \Phi = I_{L \times L} \quad \text{Eq. (3)}$$

Here, $I_{L \times L}$ is the L×L unit matrix, and the superscript "†" denotes "conjugate transpose". While such orthogonality and/or normality conditions are not required, they may be advantageous for modulating data onto the input waveforms and demodulating data form the output waveforms, as discussed below.

Each modulator 14 of the parallel array modulates a corresponding component of the input data symbol onto a preselected one of the waveforms in parallel with the other modulators 14. For example, in response to the q-th input data symbol, the k-th modulator 14 will produce a temporal sequence of output signals represented by the column vector $a_{kq} \cdot [\psi_{1k}, \psi_{2k}, \ldots, \psi_{T_sk}]^T$. Each of the output signals represents the form of the modulated k-th input waveform for one of the sampling intervals for one data block.

For each input data symbol, the adder 15 sums the L modulated input waveforms in a temporally aligned manner. For example, the adder 15 forms a weighted linear superposition of the waveforms, e.g., one data block for transmission. In the linear superposition, the starting sampling intervals of the individual modulated waveforms are temporally aligned. In response to the input data symbol $a_q$, the modulating and summing produces an output data block that may be represented by a $T_S$-dimensional column vector $s_q$. The column vector $s_q$ may be written as:

$$s_q = a_{1q} \cdot \begin{bmatrix} \psi_{11} \\ \psi_{21} \\ \vdots \\ \psi_{T_s1} \end{bmatrix} + a_{2q} \cdot \begin{bmatrix} \psi_{12} \\ \psi_{22} \\ \vdots \\ \psi_{T_s2} \end{bmatrix} + \ldots + a_{Lq} \cdot \begin{bmatrix} \psi_{1L} \\ \psi_{2L} \\ \vdots \\ \psi_{T_sL} \end{bmatrix} \quad \text{Eq. (4)}$$

$$= \Psi \cdot a_q$$

In Eq. (4), each term of the sum represents the synchronized output of a corresponding one of the modulators 14 of FIG. 1. The last form of Eq. (4) writes the output data block $s_q$ in terms of a $T_S \times L$ complex matrix representation, $\Psi$, of the set of waveforms of eqs. (2) and (3).

For each input data symbol, the transmitter 11 transmits the data block over the communication channel 13 that couples the transmitter to the receiver 12. The communication channel 13 distorts the data blocks due to its impulse response function and additive noise.

According to the embodiments, the delay-spread $T_D$ of the communication channel 13 may be greater than each data block or symbol interval $T_S$ of data blocks, i.e., $T_D \geq T_S$. For that reason, ISI may result from not only the immediately adjacent transmitted data block (q−1), but also may result from the previous data blocks (q−2, q−3, . . . ). For ease of exposition, the following discussion assumes that the delay spread is at most twice the symbol interval, i.e., $T_S \leq T_D \leq 2T_S$. The present disclosure is, however, not limited to this case, and the general situation will be discussed below. Under this assumption, ISI only results from the two previous data blocks (q−1 and q−2), and Eq. (1) simplifies when written in data block form so that the q-th transmitted data block, $s_q$, and the q-th received data block, $x_q$, are related as follows:

$$x_q = H_0 \cdot s_q + H_1 \cdot s_{q-1} + H_2 \cdot s_{q-2} + w_q \quad \text{Eq. (5a)}$$

$$= H_0 \cdot \Psi \cdot a_q + H_1 \cdot \Psi \cdot a_{q-1} + H_2 \cdot \Psi \cdot a_{q-2} + w_q \quad \text{Eq. (5b)}$$

The L×L complex matrices $H_0$, $H_1$ and $H_2$ are formed from the impulse response function of the communication channel 13 and are given by:

$$H_0 = \begin{bmatrix} h_0 & 0 & 0 & \ldots & 0 \\ h_1 & h_0 & 0 & \ldots & 0 \\ \vdots & \ddots & \ddots & \ddots & \vdots \\ h_{T_s-2} & h_{T_s-3} & h_{T_s-4} & \ldots & 0 \\ h_{T_s-1} & h_{T_s-2} & h_{T_s-3} & \ldots & h_0 \end{bmatrix} \quad \text{Eq. (6)}$$

$$H_1 = \begin{bmatrix} h_{T_s} & h_{T_s-1} & h_{T_s-2} & \ldots & h_1 \\ h_{T_s+1} & h_{T_s} & h_{T_s-1} & \ldots & h_2 \\ \vdots & \ddots & \ddots & \ddots & \vdots \\ h_{2T_s-2} & h_{2T_s-3} & h_{2T_s-4} & \ldots & h_{T_s-1} \\ h_{2T_s-1} & h_{2T_s-2} & h_{2T_s-3} & \ldots & h_{T_s} \end{bmatrix}$$

$$H_2 = \begin{bmatrix} h_{2T_s} & h_{2T_s-1} & h_{2T_s-2} & \ldots & h_{T_s+1} \\ 0 & h_{2T_s} & h_{2T_s-1} & \ldots & h_{T_s+2} \\ \vdots & \ddots & \ddots & \ddots & \vdots \\ 0 & \ldots & 0 & h_{2T_s} & h_{2T_s-1} \\ 0 & 0 & \ldots & 0 & h_{2T_s} \end{bmatrix}$$

The matrices $H_1$ and $H_2$ produce the inter-data block interference between the current data block (q) and the previous data block (q−1) and the inter-data block interference between the current data block and the previous data block (q−2), respectively. In Eq. (5), the column vector $w_q$ for the additive noise is given by $w_q = [w_{1q}, w_{2q}, \ldots, w_{T_Sq}]^T$.

The receiver 12 estimates $y_q$ by measuring correlations between the received data block and the conjugate waveforms. The measurement of each correlation involves evaluating an inner product between a received data block and each of the conjugate waveforms. In particular, the receiver 12 produces for each input data symbol, $a_q$, an L-dimensional estimate vector, $y_q$, given by:

$$y_q = \Phi^\dagger \cdot x_q = \Phi^\dagger \cdot H_0 \cdot \Psi \cdot a_q + \Phi^\dagger \cdot H_1 \cdot \Psi \cdot a_{q-1} + \Phi^\dagger \cdot H_2 \cdot \Psi \cdot a_{q-2} + \Phi^\dagger \cdot w_q.$$  Eq. (7a)

Here, the last equation results from Eq. (5b) for the channel transformation of the transmitted data block. $\Phi^\dagger \cdot H_1 \cdot \Psi \cdot a_{q-1}$ is the interference term between the current data block (q) and the preceding data block (q−1) and $\Phi^\dagger \cdot H_2 \cdot \Psi \cdot a_{q-2}$ is the interference term between the current data block (q) and the preceding data block (q−2).

Figure 3:
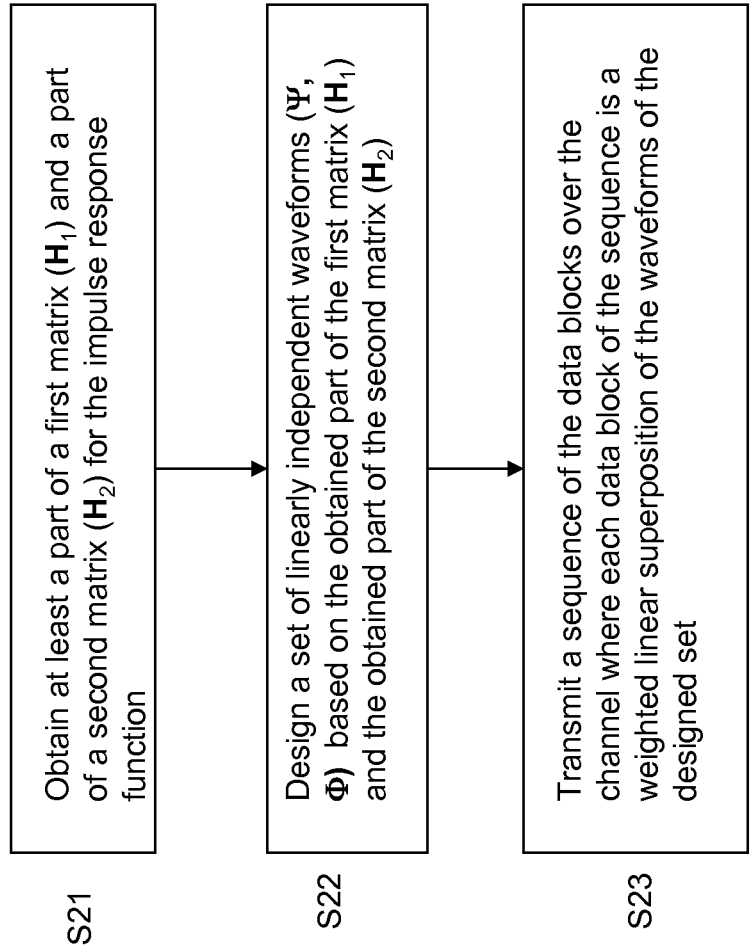
FIG. 3 illustrates a method for performing interference alignment for channel-adaptive waveform modulation according to an embodiment.

FIG. 3 illustrates a method for performing interference alignment for channel-adaptive waveform modulation according to an embodiment. The method may be performed by any type of transmitter 11 or receiver 12 that is configured for the communication system 10. The term "device" may encompass the transmitter 11 or the receiver 12.

In step S21, the device obtains at least a part of a first matrix ($H_1$) and a part of a second matrix ($H_2$) for the impulse response function of the communication channel 13 between the transmitter 11 and the receiver 12. The part of the first matrix ($H_1$) relates to channel-induced interference between a current data block (q) and a previously transmitted first data block (q−1). The part of the second matrix ($H_2$) relates to channel-induced interference between the current data block (q) and a previously transmitted second data block (q−2).

However, the device may obtain channel-induced interference between the current data block and any other two previously transmitted blocks. In other words, the embodiments of the present disclosure are not limited to only the interference relating to the immediately preceding two data blocks. In particular, the embodiments also encompass the situations where the delay spread $T_D$ is greater than twice the symbol interval $T_S$. As a result, additional matrices ($H_3, H_4, \ldots$) may be present, or any number of such matrices. As such, the device may obtain a part of these matrices ($H_3, H_4, \ldots$) for the impulse response function, where the part of the matrix $H_k$ relates to channel-induced interference between the current data block (q) and the data block transmitted k blocks earlier (q−k).

The impulse response may be obtained by transmitting a sequence of pilot signals over the communication channel 13 between the transmitter 11 and the receiver 12. Both the transmitter 11 and the receiver 12 know the sequence of transmitted pilot signals. For example, these pilot sequences may be programmed into these devices at their manufacture, installation, or upgrade. The pilot signals are transmitted on the same communication channel 13 that will be used to transport data blocks in the communication phase. The pilot signals may be transmitted along the forward channel from the transmitter 11 to the receiver 12 in the communication phase. In a duplex communication system, the pilot signals may alternately be transmitted along the reverse communication channel 13 provided that the reverse and forward communications use the same physical channel and the same carrier frequency, e.g., as in time-division duplex communications.

Then, the device measures the received pilot signals to evaluate the impulse response function of the communication channel 13. The evaluation of the channel's impulse response function involves comparing received forms of the pilot signals to the transmitted forms of the same pilot signal. The comparison determines the values of part or all of the impulse response function, i.e., $h_t$, for different values of the delay "t" as measured in numbers of sampling intervals. The comparison determines, at least, the values of $h_1, h_2, \ldots, h_{T_D}$, which define the part of the impulse response function relating to interference between sampling intervals of adjacent data blocks, i.e., $H_1$ and $H_2$ described above. As such, the device obtains a measurement, at least, of the non-zero $H_1$ matrix elements of the channel's impulse response. Furthermore, the comparison may also determine the value of $h_0$ of Eq. (1), which is not related to such channel-induced inter-data block interference. In other words, the above comparison yields the matrix $H_0$.

In S22, the device designs or configures a set of one or more linearly independent waveforms based on at least the obtained part of the first matrix ($H_1$) and the obtained part of the second matrix ($H_2$) for the impulse response function. For example, the device may design or configure the set of linearly independent waveforms such that a first subspace spanned by the linearly independent waveforms when multiplied by the obtained part of the first matrix at least partially overlaps a second subspace spanned by the linearly independent waveforms when multiplied by the obtained part of the second matrix. In other words, the interference to the current block from the two preceding data blocks (q−1 and q−2) are aligned to occupy at least a portion of the same subspace. In one particular embodiment, the first subspace and the second subspace occupy the same linear subspace. It is noted, however, that the embodiments encompass interference alignment for any two not necessarily consecutive previously transmitted blocks (e.g., q−1 and q−3, or q−2 and q−3, etc.).

The set of waveforms may include the waveforms $\Psi$ and the conjugate waveforms $\Phi$. The waveforms $\Psi$ and the conjugate waveforms $\Phi$ are designed such that the inter-block interference terms of Eq. (7a) vanishes, i.e., $\Phi^\dagger \cdot H_1 \cdot \Psi = 0$ and $\Phi^\dagger \cdot H_2 \cdot \Psi = 0$. In other words, all inter-block interference terms of Eq. (7a) vanish. Thus, the following equation may be used to obtain estimates of the linear combinations of the components of the input data symbols.

$$y_q = \Phi^\dagger \cdot H_0 \cdot \Psi \cdot a_q + \Phi^\dagger \cdot w_q.$$  Eq. (7b)

Various methods for constructing input and output waveforms to ensure that the inter-block interference terms of Eq. (7a) vanish are explained with reference to U.S. Pat. No. 7,653,120. Also, the embodiments may in addition diagonalize the matrix $\Phi^\dagger \cdot H_0 \cdot \Psi$. Methods for diagonalizing the matrix $\Phi^\dagger \cdot H_0 \cdot \Psi$ are explained with reference to U.S. Pat. No. 7,653,120.

As discussed above, according to the embodiments, the waveforms $\Psi$ and the conjugate waveforms $\Phi$ are designed such that the waveforms $\Psi$ and the conjugate waveforms $\Phi$, when multiplied by $H_1$ and $H_2$, occupy the same subspace. This is further explained with reference to FIG. 4.

Figure 4:
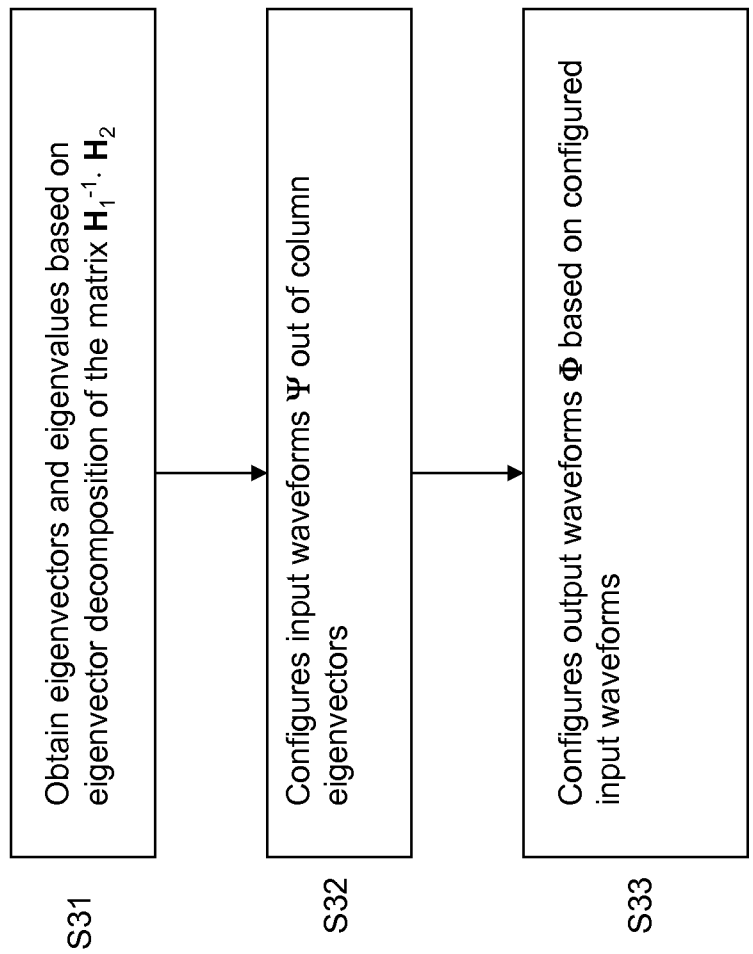
FIG. 4 illustrates a method of constructing waveforms and conjugate waveforms such that inter-symbol interference is removed according to an embodiment.

FIG. 4 illustrates a method of constructing the waveforms $\Psi$ and the conjugate waveforms $\Phi$ such that inter-symbol interference is removed according to embodiments.

In one embodiment, the waveforms $\Psi$ are selected to be a subset $[u_1, \ldots, u_i, \ldots, u_L]$ of the eigenvectors of the product of the inverse of the first matrix (i.e., $H_1^{-1}$) and the second matrix ($H_2$) of the impulse response function of the communication channel. In one particular embodiment, the subset may be the right eigenvectors of $H_1^{-1} \cdot H_2$. The matrix $H_1^{-1}$ exists assuming $H_1$ is full rank. The corresponding eigenvalues $(d_1, \ldots, d_l, \ldots, d_L)$ may encompass any value. FIG. 4 illustrates the steps of configuring such waveforms.

In step S31, the device obtains eigenvectors and their corresponding eigenvalues based on an eigenvector decomposition of the matrix $H_1^{-1} \cdot H_2$. Embodiments of the present disclosure encompass any known technique for the decomposition of a matrix into eigenvalues and eigenvectors such as the Cholesky decomposition or Hessenberg decomposition, for example.

In step S32, the device configures the waveforms $\Psi$ based on the eigenvectors of the matrix $H_1^{-1} \cdot H_2$. For example, in one embodiment, the device selects a subset of the right eigenvectors for use as the waveforms $\Psi$.

In step S33, the device configures the conjugate waveforms $\Phi$ based on the configured waveforms $\Psi$. The total inter-symbol interference at the receiver is given by the following equation:

$$H_1 \cdot \Psi a_{q-1} + H_2 \cdot \Psi a_{q-2} \quad \text{Eq. (8)}$$

Additional terms corresponding to the matrices $H_3, H_4, \ldots$ may be present in Eq. (8).

For example, if $\Psi$ is selected as a subset of the right eigenvectors of the matrix $H_1^{-1} \cdot H_2$, then the two interference terms corresponding to $H_1$ and $H_2$ in Eq. (8) span the same space of at most dimension L. The two interference terms are hence aligned in the same subspace. The conjugate waveforms $\Phi$ are chosen to be the projection onto a subspace of dimension L of the orthogonal complement of this interference subspace. This ensures that the inter-block interference terms of Eq. (7a) vanish, i.e., $\Phi^\dagger \cdot H_1 \cdot \Psi = 0$ and $\Phi^\dagger \cdot H_2 \cdot \Psi = 0$.

Because the two interference parts are aligned as described above, for certain values of the delay spread $T_D$ of the communication channel, an increased number of waveforms L may be transmitted during any symbol interval $T_S$.

Referring back to FIG. 3, in step S23, the device transmits a sequence of data blocks over the channel, where each data block of the sequence is a weighted linear superposition of the waveforms of the designed set. In some embodiments, the step of transmitting includes, for each individual data block, amplitude modulating each waveform of the designed set responsive of receipt of an input data symbol and linearly superimposing the modulated waveforms to produce the individual block.

Similarly, the device (when operating as a receiver) may receive a sequence of transmitted data blocks at the receiver. For example, the device estimates $y_q$ by measuring correlations between the received data block and the conjugate waveforms. The measurement of each correlation involves evaluating an inner product between a received data block and each of the conjugate waveforms. In particular, the receiver 12 produces an L-dimensional estimate vector, $y_q$, for each input data symbol, $a_q$, based on Eq. (7a). The conjugate waveforms are the configured conjugate waveforms $\Phi$, as explained with reference to FIG. 4.

Figure 5:
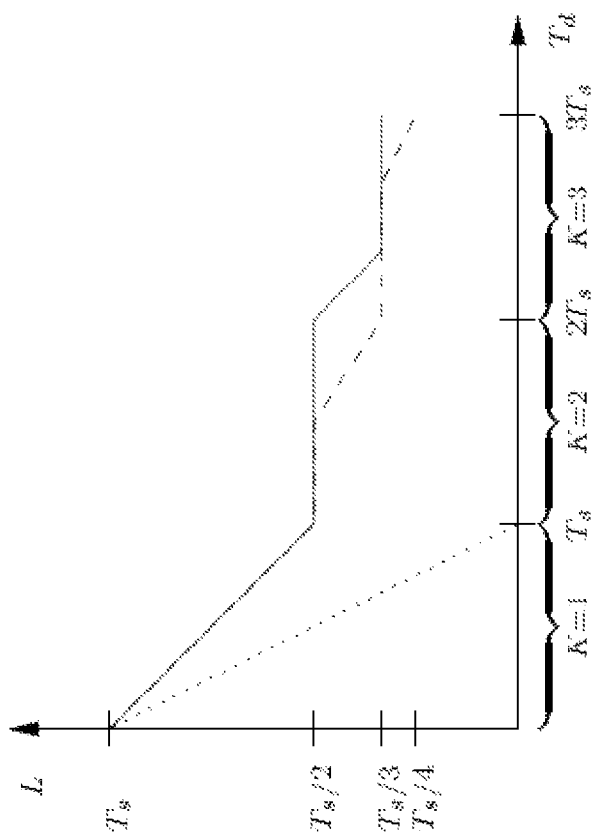
FIG. 5 illustrates a comparison of a number of orthogonal input waveforms L as a function of channel delay spread $T_D$ achieved by the embodiments of the present invention (solid line), channel-adaptive waveform modulation (dashed line), and the OFMD method (dotted line).

FIG. 5 illustrates a comparison of a number of orthogonal input waveforms L achieved by the embodiments (solid line), the channel-adaptive waveform modulation from U.S. Pat. No. 7,653,120 (dashed line), and the OFMD method (dotted line) according to an embodiment of the present invention.

When comparing the OFDM method to the channel-adaptive waveform modulation scheme, only when $T_D/T_S$ is substantially less than one, the OFDM method performs relatively well. When $T_D$ is greater or equal to $T_S$, the OFDM method achieves 0% efficiency. When comparing the embodiments of the present disclosure to the previous channel-adaptive waveform modulation scheme, the two schemes have the same performance, when $T_D$ is less than or equal to $T_S$. However, when $T_D$ is greater than $1.5T_S$, embodiments of the present disclosure can yield better performance. In particular, for $T_D=2T_S$, there is a 50% improvement in terms of available orthogonal input waveforms L.

Variations of the example embodiments are not to be regarded as a departure from the spirit and scope of the example embodiments, and all such variations as would be apparent to one skilled in the art are intended to be included within the scope of this disclosure.

What is claimed:

1. A method for transmitting a sequence of data blocks, comprising:
    obtaining at least a part of a first matrix and a part of a second matrix for an impulse response function of a communication channel, the part of the first matrix relating to channel-induced interference between a current data block and a previously transmitted first data block, the part of the second matrix relating to channel-induced interference between the current data block and a previously transmitted second data block, the second data block being transmitted before the first data block;
    designing a set of one or more linearly independent waveforms based on at least the obtained part of the first matrix and the obtained part of the second matrix for the impulse response function such that a first subspace spanned by the linearly independent waveforms when multiplied by the obtained part of the first matrix at least partially overlaps a second subspace spanned by the linearly independent waveforms when multiplied by the obtained part of the second matrix; and
    transmitting a sequence of the data blocks over the channel from a transmitter, each data block of the sequence being a weighted linear superposition of the one or more waveforms of the designed set.

2. The method of claim 1, wherein the designing step designs the set of linearly independent waveforms such that the first subspace and the second subspace occupy a same linear space.

3. The method of claim 1, wherein the designed set includes a subset of eigenvectors of a product of (1) an inverse of the first matrix and (2) the second matrix.

4. The method of claim 3, wherein the subset comprises right eigenvectors of the product.

5. The method of claim 1, wherein the designing step further includes:
    obtaining eigenvectors and corresponding eigenvalues based on an eigenvector decomposition of a product of (1) an inverse of the first matrix and (2) the second matrix; and
    selecting a subset of the obtained eigenvectors.

6. The method of claim 5, wherein the designing step further includes:
    configuring a second set of waveforms based on the selected subset, wherein the configured second set of waveforms is an orthogonal complement of the product of the selected subset and either of the first or the second matrices.

7. The method of claim 1, wherein the first data block immediately precedes the current data block and the second data block immediately precedes the first data block.

8. The method of claim 1, further comprising:
    transmitting a set of pilot signals over the communication channel that is between the transmitter and a receiver, the part of the first matrix and the part of the second matrix for the impulse response function being obtained responsive to measurements of said pilot signals.

9. The method of claim 1, further comprising:
for each one of the data blocks of the sequence, modulating the waveforms of the designed set to have amplitudes responsive of a received input data symbol and linearly superimposing the modulated waveforms to produce the each one of the data blocks.

10. The method of claim 1, wherein the designed set has a number of the waveforms equal to one half of a symbol interval when delay spread is twice the symbol interval.

11. An apparatus for communicating data, comprising:
a transmitter including
an array of modulators, each modulator being configured to modulate an amplitude of a corresponding one of linearly independent waveforms over a sequence of sampling intervals in response to receipt of each of a sequence of input data symbols; and
an adder configured to form a sequence of data blocks, each data block being a linear superposition of modulated transmitter waveforms produced by the modulators responsive to receipt of one of the input data symbols, the adder configured to transmit the data blocks via a communication channel; and
wherein the transmitter configures the modulated waveforms in a manner responsive to a part of a first matrix and a part of a second matrix for an impulse response function of the communication channel, the part of the first matrix relating to channel-induced interference between a current data block and a previously transmitted first data block, the part of the second matrix relating to channel-induced interference between the current data block and a previously transmitted second data block, the second data block being transmitted before the first data block,
wherein the transmitter configures the modulated waveforms such that a first subspace spanned by the modulated waveforms when multiplied by the part of the first matrix at least partially overlaps a second subspace spanned by the modulated waveforms when multiplied by the part of the second matrix.

12. The apparatus of claim 11, wherein the transmitter configures the modulated waveforms such that the first subspace and the second subspace occupy a same linear space.

13. The apparatus of claim 11, where the modulated waveforms include a subset of eigenvectors of a product of (1) an inverse of the first matrix and (2) the second matrix.

14. The apparatus of claim 13, wherein the subset comprises right eigenvectors of the product.

15. The apparatus of claim 11, wherein the transmitter configures the modulated waveforms by obtaining eigenvectors and corresponding eigenvalues based on an eigenvector decomposition of a product of (1) an inverse of the first matrix and (2) the second matrix and selects a subset of the obtained eigenvectors.

16. The apparatus of claim 15, wherein the transmitter configures the modulated waveforms by constructing a second set of waveforms based on the selected subset, wherein the constructed second set of waveforms is an orthogonal complement of the product of the selected subset and either of the first or second matrices.

17. The apparatus of claim 11, further comprising:
a receiver having an array of demodulators, the demodulators projecting the data blocks onto conjugate waveforms to produce estimates of a linear combination of components of the input data symbol carried by the data blocks being demodulated.

18. The apparatus of claim 17, wherein the transmitter transmits a set of pilot signals over the communication channel that is between the transmitter and the receiver, the part of the first matrix and the part of the second matrix for the impulse response function being obtained responsive to measurements of said pilot signals.

19. The apparatus of claim 11, wherein each modulator modulates the amplitude of the corresponding one of linearly independent waveforms to have amplitudes responsive of a received input data symbol and linearly superimposing the modulated waveforms to produce each one of the data blocks.

20. The apparatus of claim 11, wherein a number of the modulated waveforms is equal to one half of a symbol interval when delay spread is twice the symbol interval.

* * * * *